United States Patent
Ohhashi et al.

(10) Patent No.: US 10,181,016 B2
(45) Date of Patent: Jan. 15, 2019

(54) INFORMATION PROCESSING DEVICE, INFORMATION PROCESSING METHOD, AND PROGRAM

(71) Applicants: Hideki Ohhashi, Kanagawa (JP); Kohichi Hirai, Kanagawa (JP)

(72) Inventors: Hideki Ohhashi, Kanagawa (JP); Kohichi Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 14/891,707

(22) PCT Filed: May 15, 2014

(86) PCT No.: PCT/JP2014/063525
§ 371 (c)(1),
(2) Date: Nov. 17, 2015

(87) PCT Pub. No.: WO2014/196366
PCT Pub. Date: Dec. 11, 2014

(65) Prior Publication Data
US 2016/0125175 A1  May 5, 2016

(30) Foreign Application Priority Data
Jun. 3, 2013 (JP) ................................. 2013-116699

(51) Int. Cl.
*G06F 21/62* (2013.01)
*G06F 21/12* (2013.01)
*G06F 21/31* (2013.01)

(52) U.S. Cl.
CPC ............ *G06F 21/121* (2013.01); *G06F 21/31* (2013.01); *G06F 21/629* (2013.01); *G06F 2221/07* (2013.01); *G06F 2221/2137* (2013.01)

(58) Field of Classification Search
CPC ........ G06F 21/12; G06F 21/121; G06F 21/31; G06F 21/62; G06F 21/629; G06F 2221/2137
See application file for complete search history.

(56) References Cited

U.S. PATENT DOCUMENTS 5,675,520 A * 10/1997 Pitt, III ................. G06F 9/4443
703/23
5,959,624 A * 9/1999 Johnston, Jr. ........... G06F 9/451
715/746

(Continued)

FOREIGN PATENT DOCUMENTS

JP  2004-129247  4/2004
JP  2011-103572  5/2011

(Continued)

OTHER PUBLICATIONS

Extended European Search Report dated May 19, 2016 in European Patent Application No. 14808389.2.

(Continued)

*Primary Examiner* — Khang Do
(74) *Attorney, Agent, or Firm* — Oblon, McClelland, Maier & Neustadt, L.L.P.

(57) ABSTRACT

An information processing device includes an identification part configured to, in response to a user's operation to start any given one of a plurality of first application programs, determine whether the start of the one of the first application programs is allowed; and a request part configured to request the one of the first application programs to display a first screen which indicates the start of the one of the first application programs is not allowed when the identification part determines that the start of the one of the first application programs is not allowed, and request a second application program to display a second screen including a message when the identification part determines that the (Continued)

start of the one of the first application programs is allowed and when the message needs to be given.

9 Claims, 9 Drawing Sheets

(56) References Cited

U.S. PATENT DOCUMENTS

| | | | |
|---|---|---|---|
| 6,466,238 B1 | 10/2002 | Berry et al. | |
| 8,219,807 B1 | 7/2012 | Danoyan et al. | |
| 2002/0161908 A1 | 10/2002 | Benitez et al. | |
| 2003/0146941 A1* | 8/2003 | Bailey | G06F 3/0482 715/830 |
| 2008/0263509 A1* | 10/2008 | Brutman | G06F 8/20 717/104 |
| 2009/0013310 A1* | 1/2009 | Arner | H04L 67/02 717/120 |
| 2009/0254482 A1* | 10/2009 | Vadlamani | G06F 21/10 705/59 |
| 2011/0271335 A1 | 11/2011 | Carpenter et al. | |
| 2013/0124871 A1* | 5/2013 | Park | G06F 21/645 713/187 |
| 2013/0132713 A1 | 5/2013 | Kokubun | |

FOREIGN PATENT DOCUMENTS

| | | |
|---|---|---|
| JP | 2012-088765 | 5/2012 |
| JP | 2012-160129 | 8/2012 |
| RU | 2 364 921 C2 | 8/2009 |

OTHER PUBLICATIONS

Office Action dated Aug. 31, 2016 in Australian Patent Application No. 2014276026.
International Search Report dated Jul. 8, 2014 in PCT/JP2014/063525 filed on May 15, 2014.
Office Action dated Apr. 4, 2017 in Australian Patent Application No. 2014276026.
Office Action dated Jul. 6, 2017 in Australian Patent Application No. 2014276026.
Combine Russian Federation Office Action and Search Report dated Jan. 25, 2017 in Patent Application No. 2015150722/08(078067).

* cited by examiner

FIG.6

| USER NAME | PASSWORD | DIVISION | OFFICE | AVAILABLE APPLICATION |
|---|---|---|---|---|
| USER A | ... | ... | ... | APP B |
| USER B | ... | ... | ... | APP A, APP B |

| APPLICATION ID | AVAILABLE PERIOD |
|---|---|
| APPLICATION A | 20xx/01-20xx/12 |
| APPLICATION B | 20xx/01-20xx/12 |

24

INFORMATION PROCESSING DEVICE, INFORMATION PROCESSING METHOD, AND PROGRAM

TECHNICAL FIELD

An aspect of this disclosure is related to an information processing device, an information processing method, and a program.

BACKGROUND ART

A variety of applications which execute operations responding to interactions with a user may display similar screens from a functional viewpoint.

An example of the screens is a screen which is displayed when a user has no authority to use the application to notify the user of that he has no authority.

An embodiment of this invention aims to provide a novel display system about the similar screens for the applications.

SUMMARY OF INVENTION

In one aspect, the present disclosure provides an information processing device, an information processing method, and a program which substantially eliminate one or more problems caused by the limitations and disadvantages of the related art.

In an aspect of this disclosure, there is provided an information processing device including an identification part configured to, in response to a user's operation to start any given one of a plurality of first application programs, determine whether the start of the one of the first application programs is allowed; and a request part configured to request the one of the first application programs to display a first screen which indicates the start of the one of the first application programs is not allowed when the identification part determines that the start of the one of the first application programs is not allowed, and request a second application program to display a second screen including a message when the identification part determines that the start of the one of the first application programs is allowed and when the message needs to be given.

According to another embodiment of this invention, there is provided an information processing method including, in response to a user's operation to start any given one of a plurality of first application programs, determining whether the start of the one of the first application programs is allowed; and requesting the one of the first application programs to display a first screen which indicates the start of the one of the first application programs is not allowed when the identification part determines that the start of the one of the first application programs is not allowed, and requesting a second application program to display a second screen including a message when the identification part determines that the start of the one of the first application programs is allowed and when the message needs to be given.

According to another embodiment of this invention, there is provided a program for causing an information processing device when executing the program to perform a method including in response to a user's operation to start any given one of a plurality of first application programs, determining whether the start of the one of the first application programs is allowed; and requesting the one of the first application programs to display a first screen which indicates the start of the one of the first application programs is not allowed when the identification part determines that the start of the one of the first application programs is not allowed, and requesting a second application program to display a second screen including a message when the identification part determines that the start of the one of the first application programs is allowed and when the message needs to be given.

BRIEF DESCRIPTION OF DRAWINGS

FIG. 6 is a table showing information stored in a user information storage part.

FIG. 7 is a table showing information stored in an application information storage part.

DESCRIPTION OF EMBODIMENTS

Figure 1:
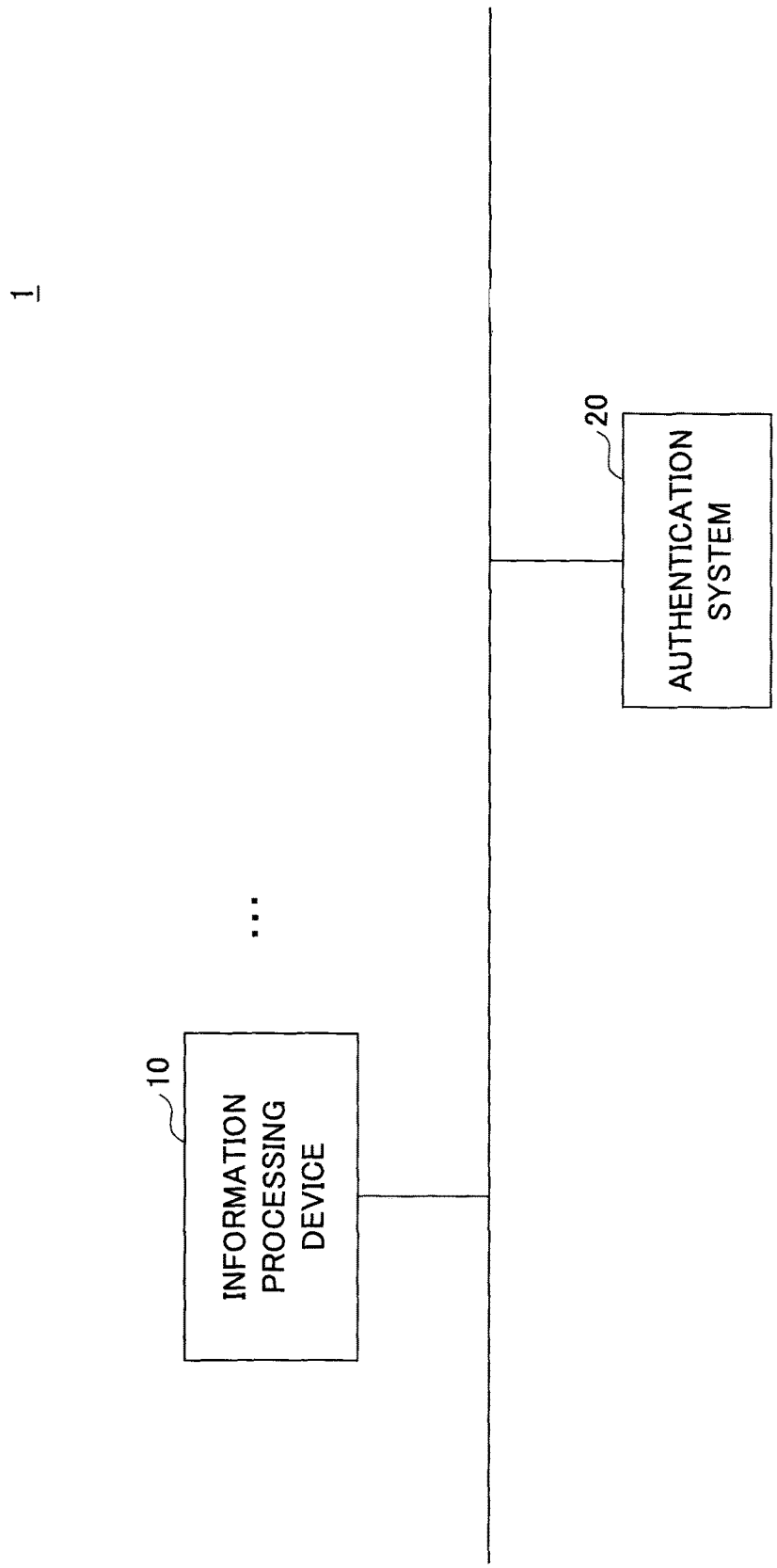
FIG. 1 is a drawing illustrating a configuration of an information processing system according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

A variety of applications which execute operations responding to interactions with a user may display similar screens from a functional viewpoint. An example of the screens is a screen which is displayed when a user has no authority to use the application to notify the user of that he has no authority.

If the above-stated functional common screen is displayed by a system which provides a runtime environment for applications such as an operating system or an application platform, the number of application development man-hours may be decreased.

However, modifying the system may result in a big impact because many applications and other programs depend on the system. Thus, it is undesirable that modification of the system is required depending on adding a new screen.

However, when applications have to implement such a common screen, problems such as increasing of application development man-hours, mismatch of look and feel, and delay of development for other screens operated by a user may occur.

An embodiment of this invention aims to provide an information processing device, an information processing method, and a program, which solve the above-mentioned problems.

FIG. 1 is a drawing illustrating a configuration of an information processing system according to an embodiment of this invention. In the information processing system 1 shown in FIG. 1, one or more information processing devices 10 and an authentication system 20 are connected via a wired or wireless network such as a local area network (LAN) or the Internet so that they can communicate with each other.

The information processing device 10 is a computer or an electronic device in which application, programs (hereinafter called just "applications") used by a user are installed. Examples of the information processing device 10 include a personal computer (PC), a tablet, a smartphone, a cellphone, an image forming apparatus, a projector, a video conference system, a digital camera, etc.

The authentication system 20 is one or more computers which authenticates a user of the information processing device 10 or identifies whether the use of application is permitted. Alternatively, the functions of the authentication system 20 may be implemented in one or some of information processing devices 10. In this case, the authentication system 20 need not be deployed.

Figure 2:
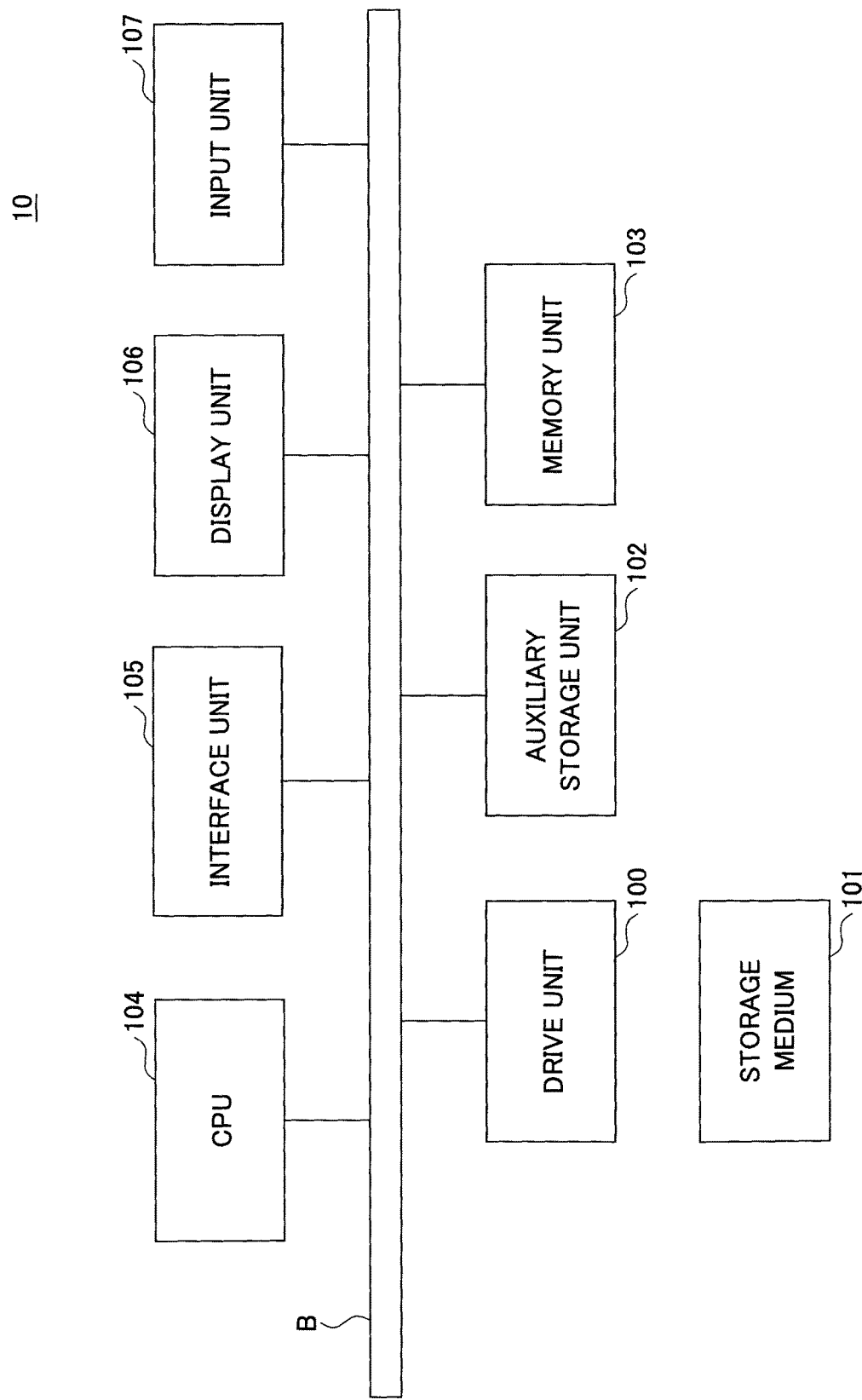
FIG. 2 is a diagram showing a hardware configuration of an information processing device according to the embodiment.

FIG. 2 is a diagram showing a hardware configuration of the information processing device according to the embodiment. The information processing device 10 shown in FIG. 2 may have a drive unit 100, an auxiliary storage unit 102, a memory unit 103, a CPU 104, an interface unit 105, a display unit 106, and an input unit 107, which are connected via a bus B each other.

A program which implements a process for the information processing device 10 is provided by a storage medium 101 such as CD-ROM. When the storage medium 101 storing the program is set to the drive unit 100, the program is installed from the storage medium 101 to the auxiliary storage unit 102 via the drive unit 100. Alternatively, the program may be downloaded from a computer via the network. The auxiliary storage unit 102 may store the installed program as well as required files and data.

The memory unit 103 may load the program from the auxiliary storage unit 102, and stores the program responding to an instruction to start the program. The CPU 104 may implement the functions of the information processing device 10 according to the program stored in the memory unit 103. The interface unit 105 may connect the information processing device to the network. The display unit 106 may display a graphical user interface (GUI) for the program. The input unit 107 may include a keyboard and a mouse, which are used by the user to accept various operations.

Figure 3:
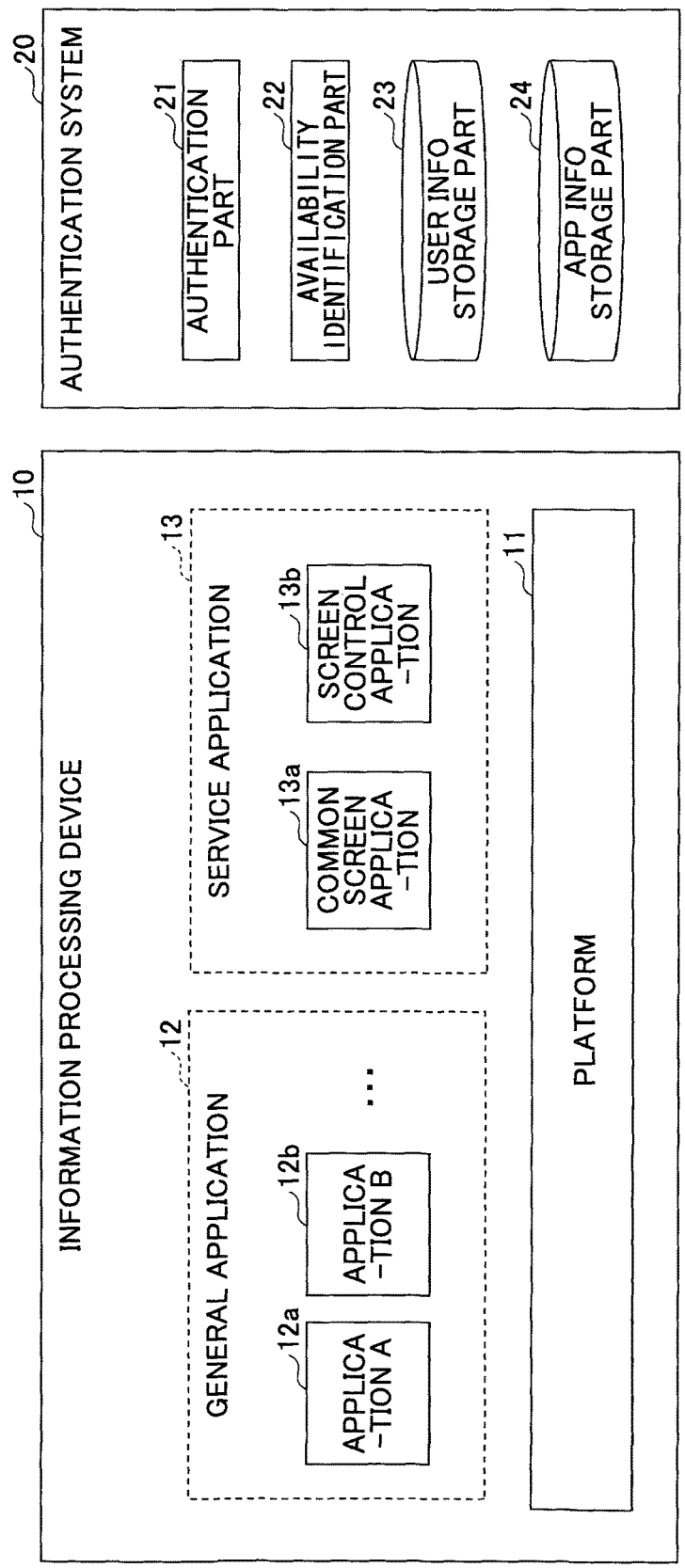
FIG. 3 is a block diagram showing a software configuration of the information processing system according to the embodiment.

FIG. 3 is a block diagram showing a software configuration of the information processing system according to the embodiment. The information processing device 10 shown in FIG. 3 may have a platform 11 and a plurality of applications operating on the platform 11. These are programs causing the CPU 104 to execute predetermined processes.

The platform 11 may provide a runtime environment for the applications. In addition, the platform 11 may perform start-and-stop control of the applications and common functions which are common in the applications. The common functions are used by each application via an application programming interface (API) provided by the platform 11, for example. The platform 11 may control user's login for the information processing device 10. An example of the platform 11 is an operating system (OS). Alternatively, the platform 11 may be implemented by an application platform such as Java™ virtual machine.

The application of the information processing device 10 may be categorized as a general application 12 or a service application 13 depending on its role. The general application 12 may provide functions for the user. In other word, the general application 12 may be used by the user directly. In FIG. 3, an application A 12a and an application B 12b are shown as examples of the general application 12. The application A 12a and the application B 12b may have any kinds of functions.

The service application 13 may provide a service commonly used from each general application 12. In FIG. 3, a common screen application 13a and a screen control application 13b are shown as examples of the service application 13. The common screen application 13a is the service application 13 which may display a common screen for each general application 12 (hereinafter called "common screen"). An example of the common screen is a screen which shows some notifications (outputs information) relating to the use of the general application 12. The function of the screen control application 13b is discussed later.

The authentication system 20 may have an authentication part 21, an availability identification part 22, a user information storage part 23, and an application information storage part 24. The authentication part 21 and the availability identification part 22 are implemented by instructions of a program installed on the computer working as the authentication system 20. The user information storage part 23 and the application information storage part 24 may be implemented by a storage device of the authentication system 20.

The authentication part 21 may authenticate the user who is logging in the information processing device 10. The availability identification part 22 may identify whether the user who logs in the information processing device 10 (hereinafter called "login user") can use the general application 12. The user information storage part 23 may store attributes of each user. The user attributes may include authentication information for the user and identification information about the general application 12 in which the user has authority to use. The application information storage part 24 may store information which is used to limit the use of each general application 12. In particular, the application information storage part 24 may store the information representing a period during each general application 12 is available (or allowed to be used). In addition, when the availability depends on an office or a division, the application information storage part 24 may store information representing the office or the division which is allowed or not allowed to use each general application 12. The application information storage part 24 may store any other information.

Figure 4:
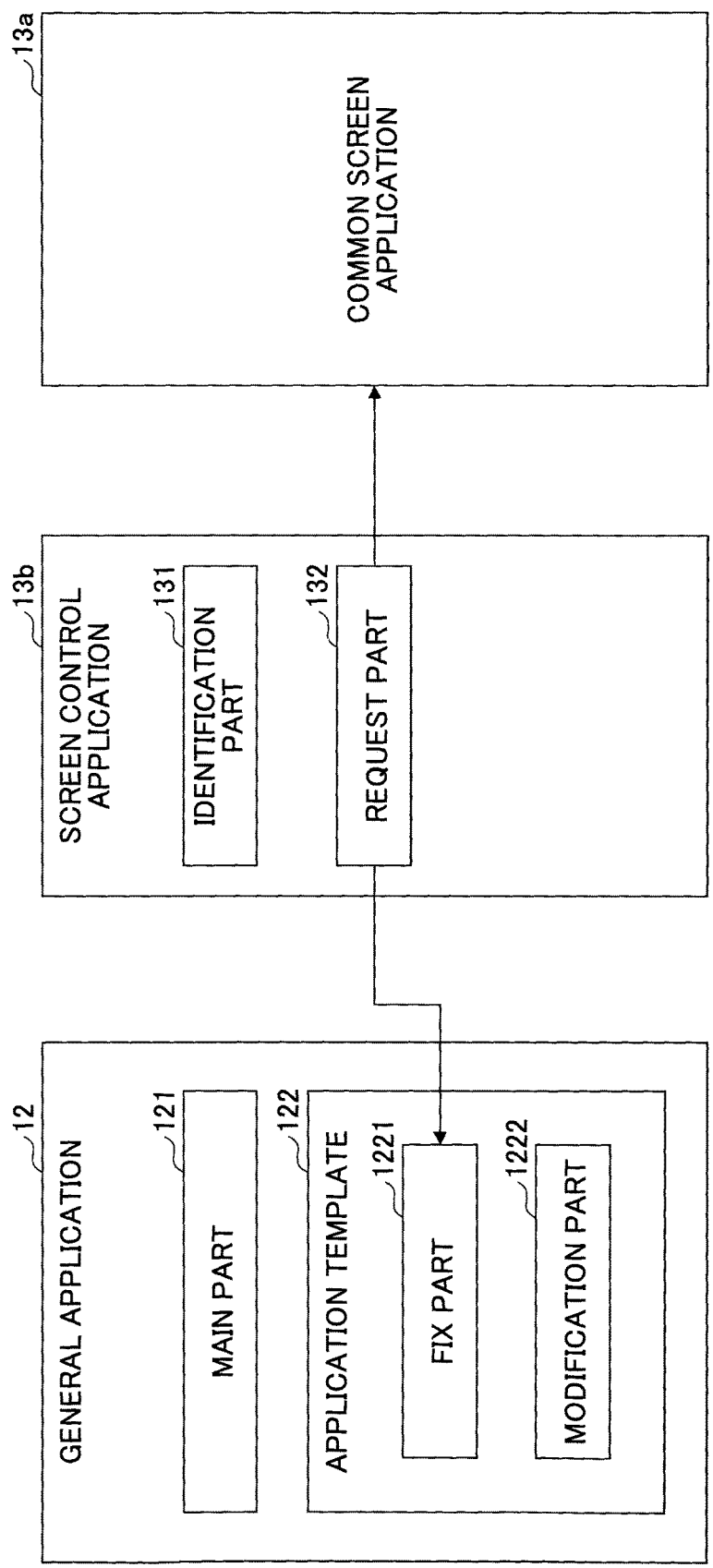
FIG. 4 is a block diagram showing a functional configuration of a general application and a screen control application.

In the following, the general application 12 and the screen control application 13b are explained. FIG. 4 is a block diagram showing a functional configuration of the general application 12 and the screen control application 13b.

As shown in FIG. 4, the general application 12 such as the application A 12a or the application B 12b may have a main part 121 and an application template 122. The main part 121 may execute the core function of the general application 12. In other words, the main part 121 may implement the primary function of the general application 12.

The application template 122 may be a common part among other general applications 12. The application template 122 is implemented as a template in advance. For example, the source code of the application template 122 may be distributed to a developer of each general application 12. Alternatively, the object code of the application template 122 may be distributed to the developer. When the source code is distributed, the information processing device may have a system to check whether the source code is modified fraudulently.

The application template 122 may have a fix part 1221 and a modification part 1222. The fix part 1221 may include an interface which may be called from other applications (e.g. the service application 13) and fixed implementation for the interface, which are required for each general application 12. The fixed implementation means an implementation for which re-writing is not allowed. Thus, the fix part 1221 is the common implementation in the general applications 12. The fix part 1221 may include an interface accepting a display request for a common screen and an implementation for displaying the common screen depending on the display request. The modification part 1222 may provide a function to customize a part of the fix part 1221. Thus, the modification part 1222 may perform a certain modification to the fix part 1221 for each general application 12. For example, the modification part 1222 may modify a display aspect of the common screen displayed by the fix part 1221. However, the modification part 1222 may modify the fix part 1221 to a limited extent. For example, the modification part 1222 may not disable a process which must be executed by each UI application implemented in the fix part 1221.

When the general application 12 is implemented by object-oriented programming language, the modification part 1222 may be a sub-class of the fix part 1221. In this case, the sub-class may customize the screen displayed by the fix part 1221. Alternatively, the modification part 1222 may be a predetermined function to be called by the fix part 1221 at a predetermined timing. In this case, the function may customize the screen displayed by the fix part 1221. Alternatively, the modification part 1222 may be a script file read by the fix part 1221 at a predetermining timing. In this case, a script which may customize the screen displayed by the fixed part is described in the script file. The fix part 1221 may interpret the script, and updates the screen according to the modification defined by the script. Alternatively, the modification part 1222 may be a configuration file read by the fix part 1221. In this case, the configuration file may include values for attributes of display elements for the screen (display parts). For example, a display element such as a label which shows a string may have a string. The fix part 1221 may reflect the value configured in the configuration file on the screen.

The fix part 1221 included in each general application 12 and the common screen application 13*a* includes a common function in displaying the common screen. However, the common screens displayed by the fix part 1221 and the common screen application 13*a* are different. In particular, the fix part 1221 may display a common screen which limits the use of the general application 12. The common screen application 12*a* may display a common screen which does not limit the use. For example, while the common screen which limits the use of the general application 12 is displayed, the user cannot operate the general application 12. When the user closes (eliminates) the common screen, the general application 12 is also closed. In another example, while the common screen which does not limit the use is displayed, the user may operate the general application 12. After the user closes the common screen, the user may continue to use the general application 12.

The reason why the subject displaying the common screen differs depending on whether user's operation for the general application 12 is limited is explained below. From the platform 11, each general application 12 and common screen application 13*a* is an independent application. Thus, there is no priority between a screen displayed by the general application 12 and a screen displayed by the common screen application 13*a*. The user may switch the screen which is displayed on the top or is operable according to user's operation. Thus, it is difficult to limit operations on the main screen of the general application 12, which is a separate application from the common screen application 13*a*, with the common screen displayed by the common screen application 13*a*. However, it is easy to limit the use of the general application 12 with the common screen displayed by the general application 12. When the fix part 1221 of the general application 12 is implemented so that the general application 12 stops after the common screen is closed, the user cannot use the general application 12 when the common screen is displayed.

The fix part 1221 of each general application 12 may be configured to display the common screen which does not limit the use of the general application 12. However, when the fix part 1221 of each general application 12 displays all kinds of the common screens, implementation scale may become big. As the implementation of the fix part 1221 becomes bigger, the data size of each general application 12 becomes bigger, and the consumption use of memory becomes greater. To deal with the problem, the common screen application 13*a* is used in this embodiment. From a viewpoint of decreasing memory consumption, it is desirable that the common screen application 13*a* displays the common screen for each general application 12 as much as possible. However, only the common screen which limits the use of the general application 12 is displayed by the fix part 1221 of the application template 122 in order to ensure limitation for the use of the general application 12.

In the condition that the common screen is displayed by the fix part 1221 of the general application 12 or the common screen application 13*a*, the screen control application 13*b* is responsible for separately calling either the fix part 1221 of the general application 12 or the common screen application 13*a* depending on the need for the limitation. In order to carry out the responsibility, the screen control application 13*b* may have an identification part 131 and a request part 132. The identification part 131 may identify whether the general application 12 which is selected as a starting target is allowed to be started. Responding to the identification result from the identification part 131, the request part 132 may request the fix part 1221 of the general application 12 or the common screen application 13*a* to display the common screen. When the start of the general application 12 is not allowed, the screen control application 13*b* may request the fix part 1221 of the general application 12 to display the common screen which indicates that the start is not allowed. When the start of the general application 12 is allowed but notification has to be made (predetermined information has to be output) for the user, the screen control application 13*b* may request the common screen application 13*a* to display the common screen which indicates the notification (shows the information).

Figure 5:
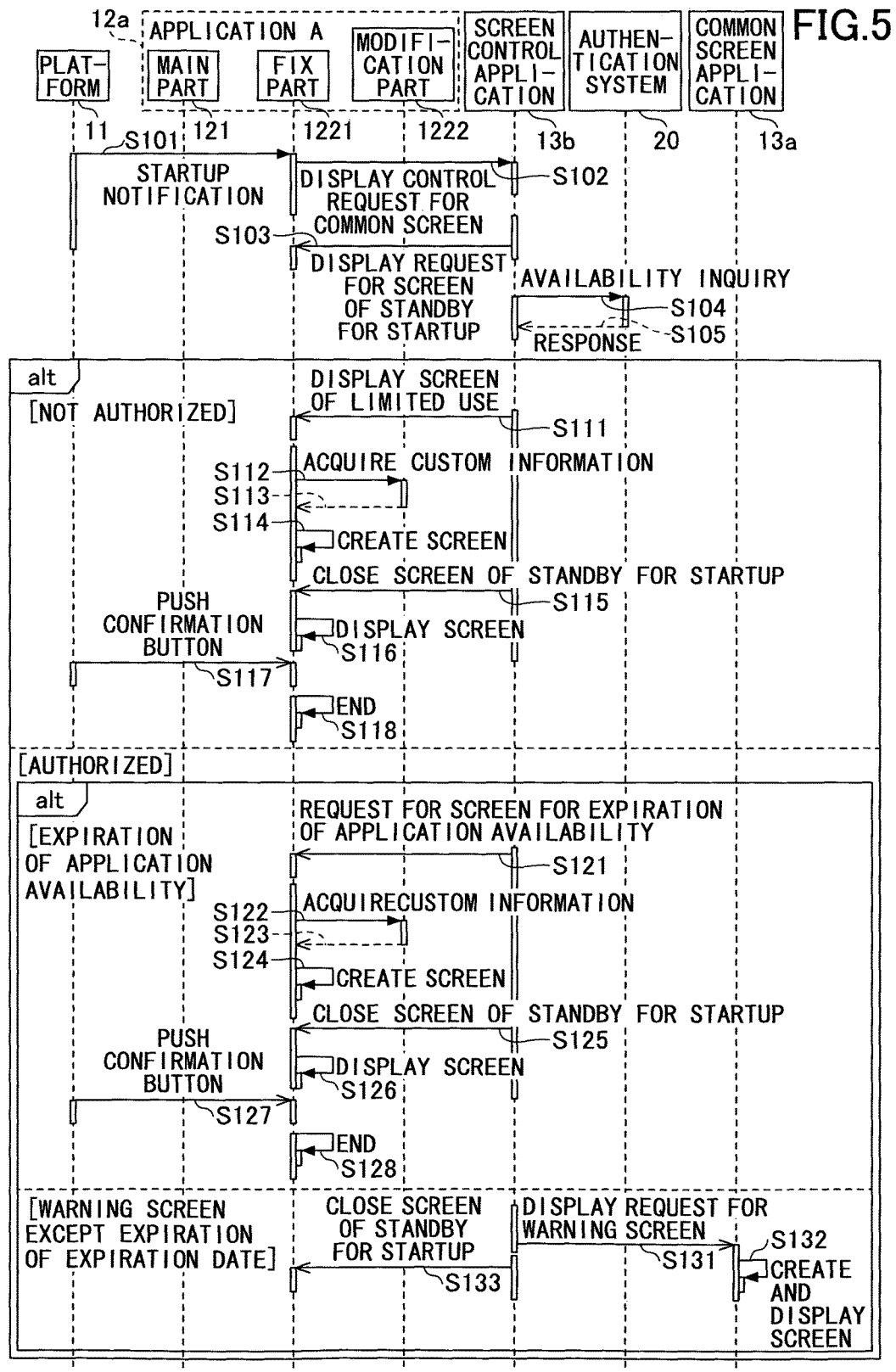
FIG. 5 is a sequence diagram for explaining a process performed by the information processing system according to the embodiment.

In the following, the process executed in the information processing system 1 is discussed. FIG. 5 is a sequence diagram for explaining a process performed by the information processing system according to the embodiment. In the initial state of FIG. 5, a user has been authorized by the platform 11. The authorization is executed as follows. First, a username and a password are input on a login screen shown on the display unit 106 displayed by the platform 11. The platform 11 transmits an authentication request specifying the username and the password to the authentication system 20. The authentication part 21 of the authentication system 20 authorizes the received username and the password by comparing them with a username and a password stored in the user information storage part 23, and transmits the authentication result to the platform 11. When authentication succeeds, the platform 11 causes the display unit 106 to display an initial screen (hereinafter called "home screen").

For example, when the login user inputs a startup instruction for the application A 12a into the information processing device 10, the fix part 1221 of the application A 12a receives a notification which indicates the startup instruction is input (startup notification) from the platform 11 (S101). The startup notification may be implemented by an event or a signal, for example. Thus, the fix part 1221 has a callback function for handling the event or the signal indicating the startup notification is transmitted. The login user may input the startup instruction of the general application 12 by selecting an icon of the general application 12 which is displayed on the home screen of the information processing device 10, for example.

The fix part 1221 sends a request for display control of a common screen to the screen control application 13b in the callback function (S102). The communications between applications are implemented by using a known technique such as an inter-process communication, an event, or a signal. Alternatively, the startup notification of the application A 12a may be transferred to the screen control application 13b directly rather than going through the fix part 1221 of the application A 12a.

Next, the screen control application 13b sends a request for displaying a screen of standby for startup to the fix part 1221 via the interface for the fix part 1221 of the application A 12a (S103). Responding to the request, the fix part 1221 of the application A 12a displays the screen of standby for startup. The screen of standby for startup is a common screen indicating a message such as "Please wait." which notifies the user so that the system does not get hosed when the startup of the application requires time.

Next, the identification part 131 of the screen control application 13b inquires of the authentication system 20 whether the login user is allowed to use the application A 12a (S104). The inquiry may include the username of the login user and identification of the application A 12a (hereinafter called "app ID").

In response to the inquiry, the availability identification part 22 of the authentication system 20 refers to the user information storage part 23 and the application information storage part 24, and determines whether the login user is authorized to use the application A 12a.

FIG. 6 is a table showing information stored in the user information storage part. As shown in FIG. 6, the user information storage part 23 may store a username, a password, a division, an office, an available application(s), etc. The username and the password are used for user authentication. The division and the office are examples of user's attributes. The available application indicates the app IDs of the general applications which the user is authorized to use. As shown in FIG. 6, the app ID may include alphanumeric characters.

When the app ID included in the inquiry is stored in the column "available application" of the user information storage part 23 for the username also included in the inquiry, the availability identification part 22 determines that the login user has authority to use the application A 12a. When the app ID included in the inquiry is not stored in the column "available application" of the user information storage part 23 for the username also included in the inquiry, the availability identification part 22 determines that the login user does not have authority to use the application A 12a.

When the availability identification part 22 determines that the login user has authority to use the application A 12a, the availability identification part 22 further refers to the application information storage part 24.

FIG. 7 is a table showing information stored in the application information storage part. As shown in FIG. 7, the application information storage part 24 may stores an available period of each general application 12 associated by each app ID. The available period indicates a period during which the use of each general application 12 is permitted.

The availability identification part 22 refers to the application information storage part 24, and determines whether the present date and time falls within the available period of the application A 12a.

The availability identification part 22 transmits a response including the above-mentioned determination result to the screen control application 13b (S105). The response includes information representing whether the login user has authority to use the application A 12a. If the available period exists, the response further includes the remaining days from the present date and time to the end of the available period. However, when the present date and time is out of the available period of the application A 12a, the response includes information representing expiration of application availability.

On receiving the response from the availability identification part 22, the screen control application 13b branches the process.

When the response include information representing that the login user does not have authority to use the application A 12a, the identification part 131 of the screen control application 13b determines that the start of the application A is not allowed. Thus, the request part 132 of the screen control application 13b requests the fix part 1221 to display a screen of limited use via the interface provided by the fix part 1221 of the application A 12a. The screen of limited use is one of the common screens, which is used to limit use of a general application 12 (disallow, a user to use a general application 12).

In response to the display request of the screen of limited use, the fix part 1221 of the application A 12a acquires custom information about a predetermined screen of limited use from the modification part 122 of the application A 12a (S112, S113). Next, the fix part 1221 creates the screen of limited use (S114).

Next, the request part 132 of the screen control application 13b requests the fix part 1221 to close the screen of standby for startup via the interface provided by the fix part 1221 of the application A 12a (S115). The fix part 1221 closes the screen of standby for startup. Responding to the close of the screen of standby for startup, the fix part 1221 displays the screen of limited use created in S114 on the display unit 106 (S116).

Figure 8:
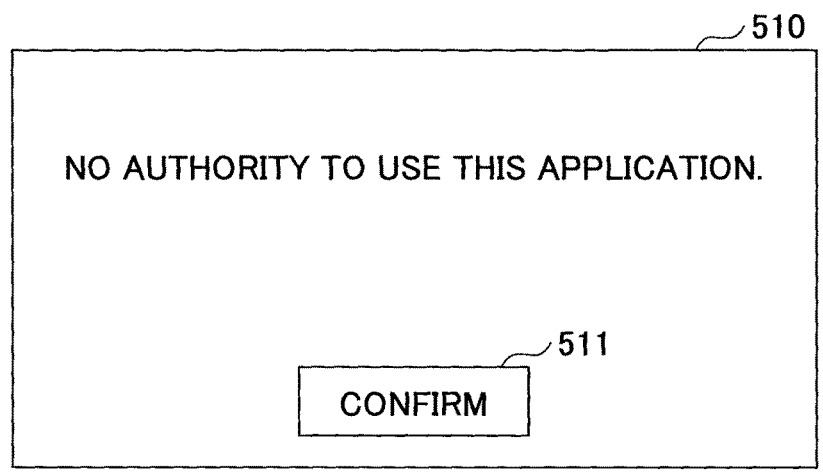
FIG. 8 is a drawing illustrating a screen of limited use.

FIG. 8 is a drawing illustrating the screen of limited use. As shown in FIG. 8, the screen of limited use 510 may include at least a message indicating that the user does not have authority to use the chosen general application 12 and a conformation button 511. The common screen including the screen of limited use 510 displayed by the fix part 1221 of the application template 122 is created as an application modal dialog, for example. The application modal dialog prevents the user operating the application while the application modal dialog is being displayed. Alternatively, the common screen displayed by the fix part 1221 of the application template 122 may be a system modal dialog. The system modal dialog prevents the user operating the OS while the system modal dialog is being displayed. Thus, when a main screen of the application A 12a is displayed by the main part 121 of the application 12a before the screen of limited use 510 is displayed, the login user cannot operate the application A 12a via the main screen while the screen of limited use 510 is displayed.

When the confirmation button 511 of the screen of limited use 510 is pushed by the login user (S117), the fix part 1221 of the application A 12a finishes the process or thread of the application 12a A. Thus, the fix part 1221 stops the application A 12a, and the login user cannot use the application A 12a.

When the response from the availability identification part 22 includes information representing that the login user has authority to use the application A 12a and information representing the available period expires, in S121-S128, the same steps of S111-S118 are executed. Also in this case, the use of the application A 12a by the login user should be limited (banned). However, as a common screen displayed to limit the user of the application A 12a for the login user, a screen for expiration of application availability is displayed. The screen for expiration of application availability is similar (dialog) to the screen of limited use 510 except for a message indicating that the available period expires.

When the response from the availability identification part 22 includes information representing that the login user has authority to use the application A 12a and the remaining days from the present date and time to the end of the available period, the request part 132 of the screen control application 13b requests the common screen application 13a to display a warning screen (S131). The request may include information representing a display content of the warning screen such as a message displayed on the warning screen. The warning screen is one of common screens, which notifies the user of some information. In response to the request, the common screen application 13a creates the warning screen and displays it (S132).

Figure 9:
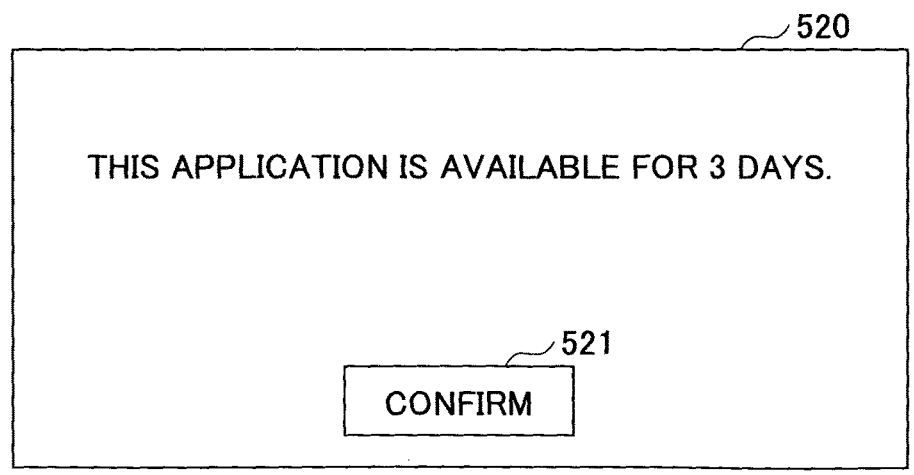
FIG. 9 is a drawing illustrating a warning screen.

FIG. 9 is a drawing illustrating the warning screen. As shown in FIG. 9, the warning screen 520 may include at least a message indicating the remaining days from the present date and time to the end of the available period and a confirmation button 521. The warning screen 520 may be either a modal dialog or an application modal dialog. The common screen displayed by the common screen application 13a may be any type of screens except a system modal dialog.

Next, the request part 132 of the screen control application 13b requests the fix part 1221 to close the screen of standby for startup via the interface provided by the fix part 1221 of the application A 12a. In response to the request, the fix part 1221 closes the screen of standby for startup. Subsequently the main part 121 of the application A 12a executes its core function. For example, the main screen of the application A 12a is displayed. The user may operate the main screen of the application A 12a while the warning screen 520 is being displayed.

As discussed above, according to this embodiment, when use of the general application should be limited, the screen control application 13b requests the fix part 1221 of the general application 12 to display the common screen. Here, the fix part 1221 has the fixed implementation so that an application developer cannot override the code of the fix part 1221. Thus, the general application 12 may execute processes planed or expected by the screen control application 13b (e.g. a general application quit after displaying a common screen). As a result, the use of the general application 12 may be limited properly. In addition, by proving the application template 122 in advance, workload of the application developer decreases, and consistent look and feel are provided in each common screen.

When use of the general application does not have to be limited, the screen control application 13b requests the common screen application 13a to display the common screen. The common screen application 13a displays the common screen so that the user is given some information, without any limitation for the use of the general application 12. In addition, the implementations for displaying the common screen may be aggregated in the common screen application 13a. As a result, the memory consumption decreases, upgrading of the common screens displayed by the common screen application 13a becomes easier and consistent look and feel are provided in each common screen.

Therefore, according to this embodiment, a notable display system to display common screens for a plurality of applications is provided.

It may be considered that, in order to limit the use of the general application 12, the common screen displayed by the common screen application 13a is implemented as a system modal dialog, and when the common screen is closed, the common screen application 13a transmits a force-quit signal to the general application 12. However, in this case, while the common screen is displayed, the user cannot operate any other applications or OS function as well as the chosen general application 12. Thus, that may degrade operability of the whole information processing device 10. In addition, since the general application 12 is force-quit, the general application cannot perform end processing correctly, and it may cause an unstable condition of the general application 12. From the above-stated reason, it is preferable that the common screens to limit the user of the general application 12 be displayed by common screen application 13a as discussed in this embodiment.

The fix part 1221 of the general application 12 is not necessarily distributed in the form of the application template 122. For example, an interface to be implemented in each general application 12 may be defined, and the implementation of the fix part 1221 may be left to a developer of the general application 12. In this case, the implementation for the interface may be flexible, and the modification part 1222 is not necessarily required.

In this embodiment, a function to display screens of the general application 12 is implemented in each application. In other words, this embodiment provides lower independency to the platform 11. Thus, when a new common screen is added, the application template 122 or the common screen application 13a may be modified, and the need for modifying the platform 11 may decrease.

In the following, another embodiment is discussed. Here, the discussion focuses on the difference from the above-described embodiment. Thus, the features which are not discussed in particular may be similar to the above-described embodiment.

In this embodiment, the modification part 1222 of the application template 122 may keep the custom information about the common screen application 13a. In this case, a procedure illustrated in FIG. 10 may be executed according to S131 shown in FIG. 5.

Figure 10:
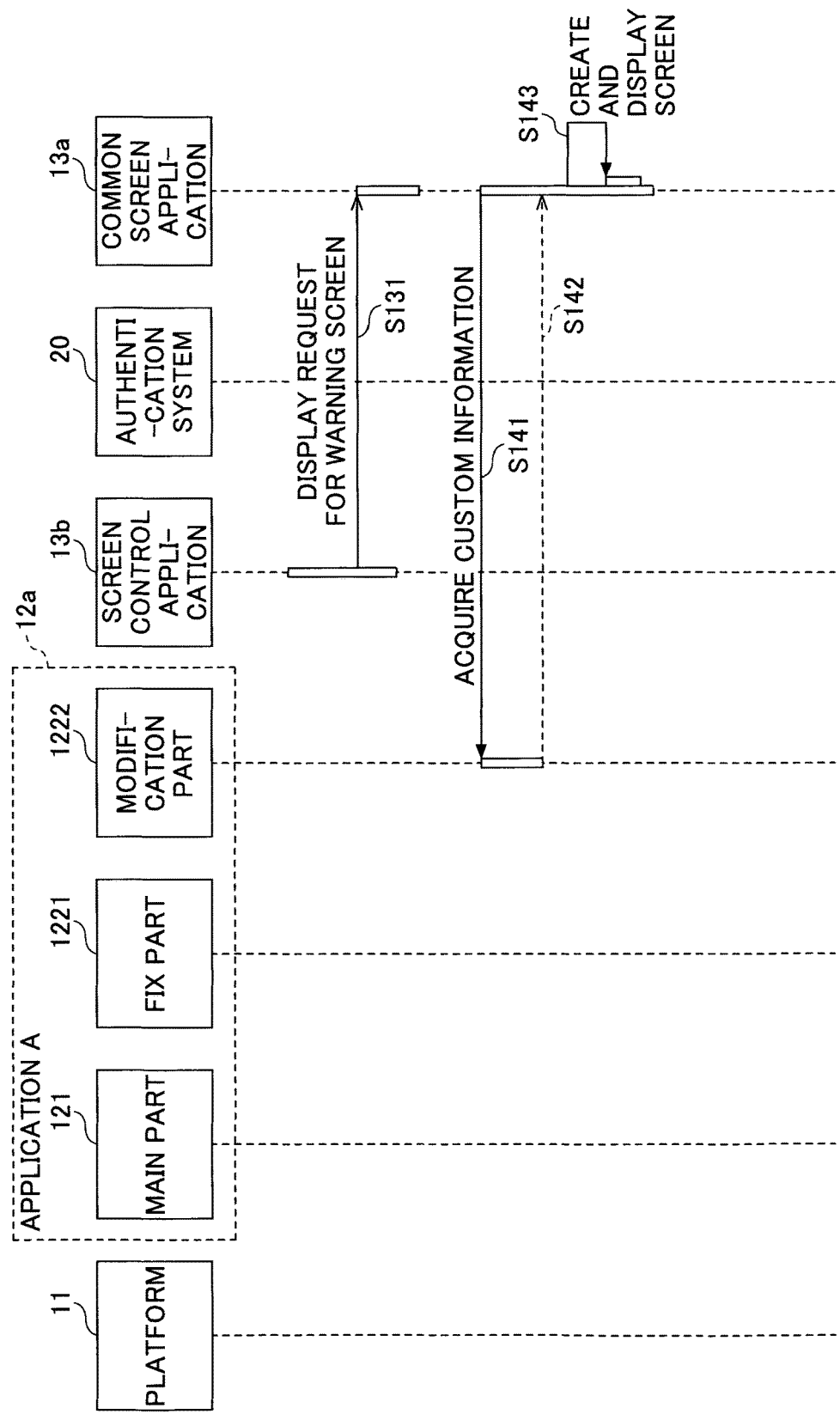
FIG. 10 is a sequence diagram for explaining a process performed by the information processing system according to another embodiment according to this invention.

FIG. 10 is a sequence diagram for explaining a process performed by the information processing system according to this embodiment. As shown in FIG. 10, the same step number is assigned with FIG. 5 for the step for the same processing.

Responding to a display request of a warning screen (S131), the common screen application 13a acquires custom information about the warning screen from the modification part 122 of the application A 12a (S141, S142). Subsequently, the common screen application 13a creates the warning screen, and displays it (S143). The warning screen reflects the custom information acquired from the modification part of the application A 12a. For example, a difference message may be displayed.

As stated above, in this embodiment, the common screen displayed by the common screen application 13a may be customized for each general application 12.

The information processing device 10 according to this embodiment may operate as an operation part (operation panel) of an device such as an image forming device or a projector.

Figure 11:
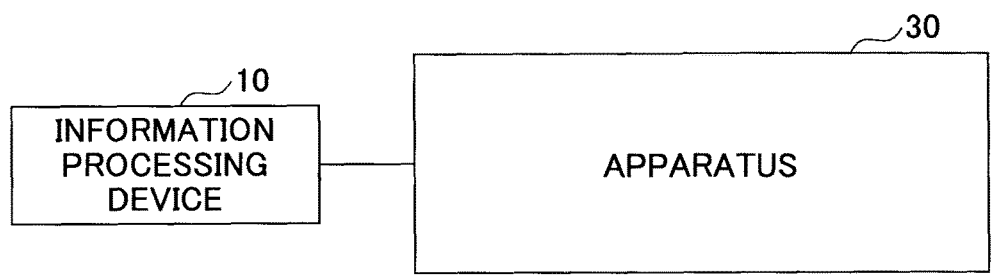
FIG. 11 is a block diagram illustrating the information processing device as an operation part of an device.

FIG. 11 is a block diagram illustrating the information processing device as an operation part of an device. As shown in FIG. 11, the device 30 is connected to the information processing device 10. The communications between the device 30 and the information processing device 10 may be done via a network such as a universal serial bus (USB), a short range wireless network, or a wired or wireless local area network. When the information processing device 10 operates as an operation part of the device 30, a tablet or a smartphone is suitable as an information processing device 10.

The information processing device 10 is fixed and installed at a predetermined position of the device 30 (e.g. a position where the operation panel is installed). Thus, the information processing device 10 and the device 30 may be considered as a single device. Alternatively, the information processing device 10 may be removable (detachable) from the device. When the information processing device 10 is detached, the information processing device 10 may still operate as an operation part of the device 30 via a wireless network.

In the above-stated embodiments, the general application 12 is an example of a first application program. In the above-stated embodiments, the common screen application 13a is an example of a second application program. In the above-stated embodiments, the fix part 1221 is an example of a common part. In the above-stated embodiments, the modification part 1222 is an example of a unique part.

Various kinds of embodiments are discussed above, but this invention, is not limited to the embodiments. Various modifications and replacement may occur to those skilled in the art without departing from the spirit and scope of the invention.

The present application is based upon and claims the benefit of priority of Japanese Patent Application No. 2013-116699 filed on Jun. 3, 2013, the entire contents of which are incorporated herein by reference.

CITATION LIST

Patent Literature

[Patent Document 1] Japanese Laid-open Patent Publication No. 2011-103572

The invention claimed is:

1. An information processing device comprising:
circuitry configured to
store a plurality of first application programs and a single common screen application program that is separate from the plurality of first application programs;
in response to a user's operation to start any given one of the plurality of first application programs, display a screen of standby for startup and determine, in parallel with displaying the screen of standby for startup, whether the start of the one of the first application programs is allowed;
request the one of the first application programs to display a first screen which indicates the start of the one of the first application programs is not allowed when the circuitry determines that the start of the one of the first application programs is not allowed, and request the common screen application program to display a second screen including a message when the circuitry determines that the start of the one of the first application programs is allowed and when the message needs to be given, the second screen being stored in the common screen application;
receive a new common screen; and
store the new common screen in the common screen application.

2. The information processing device as claimed in claim 1, wherein
each of the first application programs includes a common part configured to execute a common function,
when the circuitry determines that the start of the one of the first application programs is not allowed, the circuitry is configured to request the common part of the one of the first application programs to display the first screen, and
the common part is configured to, responding to the request from the circuitry for the common part, cause the information processing device to both display the first screen and stop the start of the one of the first application programs.

3. The information processing device as claimed in claim 2, wherein each of the first application programs includes a unique part configured to make a unique change on the first screen depending on its own first application program, and the unique part is configured to cause the information processing device to make the unique change on the first screen.

4. An information processing method comprising:
storing a plurality of first application programs and a single common screen application program that is separate from the plurality of first application programs;
in response to a user's operation to start any given one of the plurality of first application programs, displaying a screen of standby for startup and determining, in parallel with displaying the screen of standby for startup, whether the start of the one of the first application programs is allowed;
requesting the one of the first application programs to display a first screen which indicates the start of the one of the first application programs is not allowed when a determination that the start of the one of the first application programs is not allowed is made, and requesting the common screen application program to display a second screen including a message when a determination that the start of the one of the first application programs is allowed and when the message needs to be given is made, the second screen being stored in the common screen application;

receiving a new common screen; and storing the new common screen in the common screen application.

5. The information processing method as claimed in claim 4, wherein each of the first application programs includes a common part configured to execute a common function, when the determination that the start of the one of the first application programs is not allowed is made, the requesting includes requesting the common part of the one of the first application programs to display the first screen, and the common part is configured to, responding to the request to display the first screen, cause an information processing device to both display the first screen and stop the start of the one of the first application programs.

6. The information processing method as claimed in claim 5, wherein each of the first application programs includes a unique part configured to make a unique change on the first screen depending on its own first application program, and the unique part is configured to cause the information processing device to make the unique change on the first screen.

7. A non-transitory computer readable medium including a computer executable program for causing an information processing device when executing the program to perform a method comprising:

storing a plurality of first application programs and a single common screen application program that is separate from the plurality of first application programs;

in response to a user's operation to start any given one of the plurality of first application programs, displaying a screen of standby for startup and determining, in parallel with displaying the screen of standby for startup, whether the start of the one of the first application programs is allowed;

requesting the one of the first application programs to display a first screen which indicates the start of the one of the first application programs is not allowed when a determination that the start of the one of the first application programs is not allowed is made, and requesting the common screen application program to display a second screen including a message when a determination that the start of the one of the first application programs is allowed and when the message needs to be given is made, the second screen being stored in the common screen application;

receiving a new common screen; and storing the new common screen in the common screen application.

8. The non-transitory computer readable medium as claimed in claim 7, wherein each of the first application programs includes a common part configured to execute a common function, when the determination that the start of the one of the first application programs is not allowed is made, the requesting includes requesting the common part of the one of the first application programs to display the first screen, and the common part is configured to, responding to the request to display the first screen, cause the information processing device to both display the first screen and stop the start of the one of the first application programs.

9. The non-transitory computer readable medium as claimed in claim 8, wherein each of the first application programs includes a unique part configured to make a unique change on the first screen depending on its own first application program, and the unique part is configured to cause the information processing device to make the unique change on the first screen.

* * * * *